Patented Apr. 18, 1933

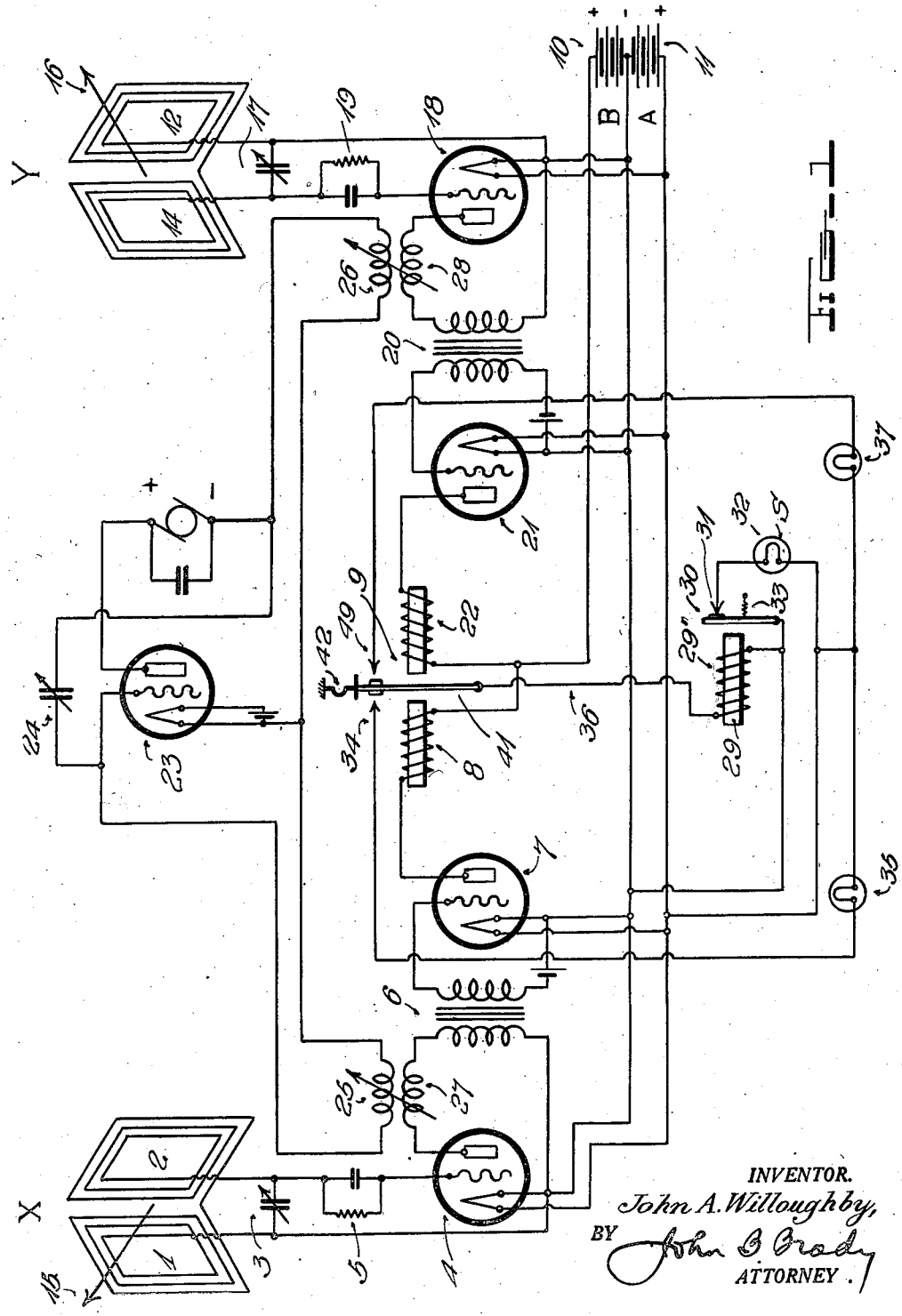

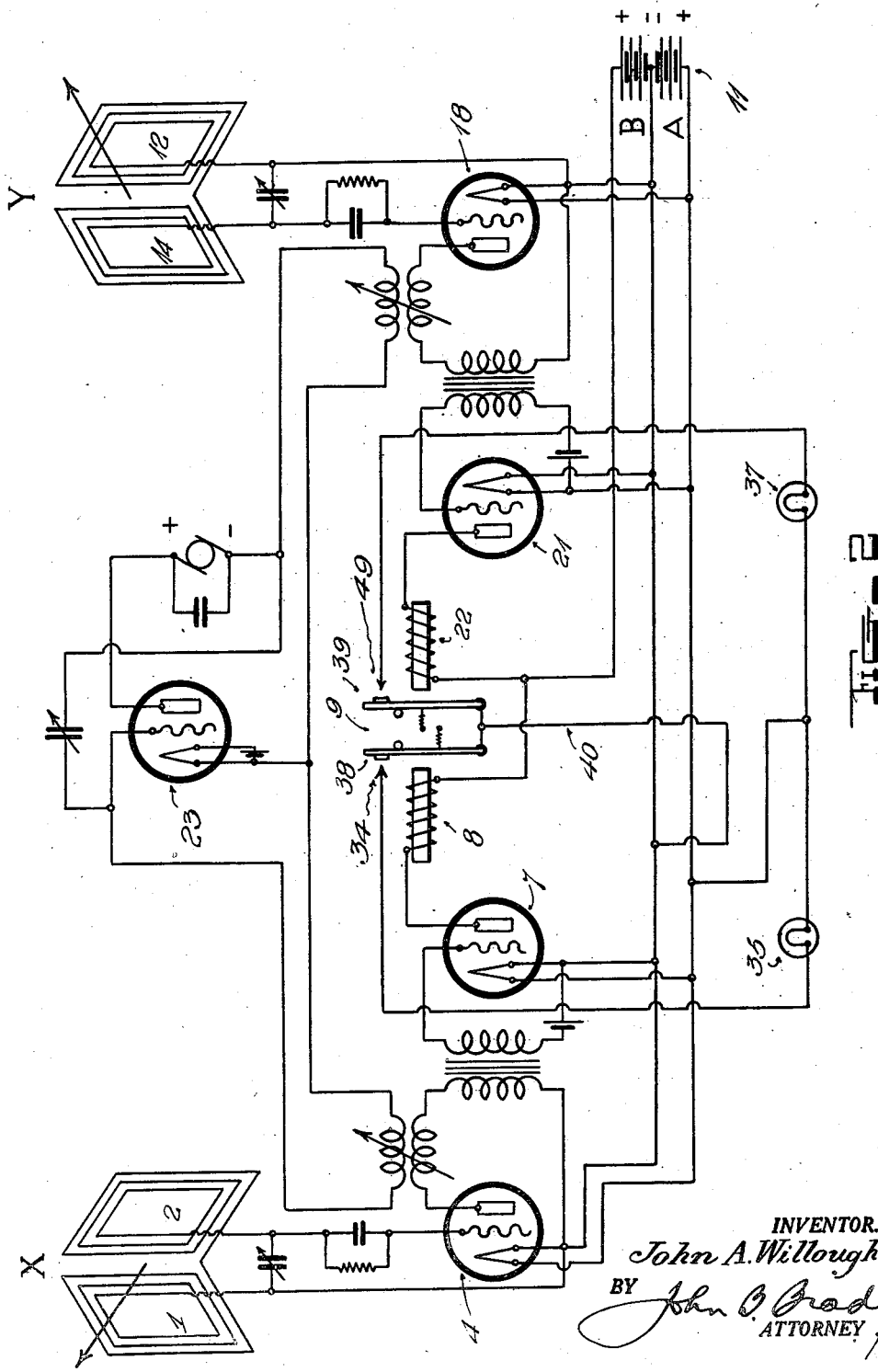

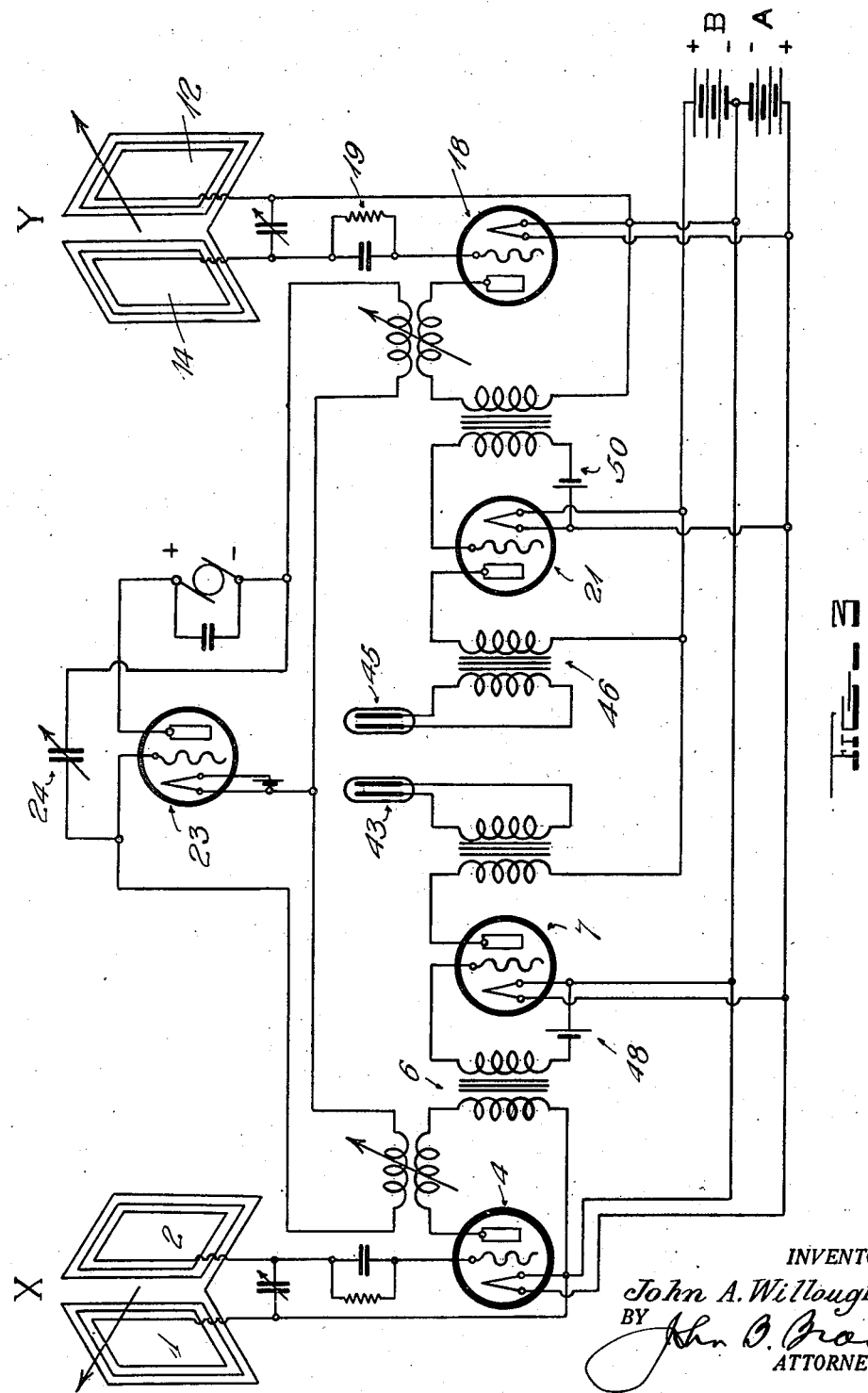

1,903,846

UNITED STATES PATENT OFFICE

JOHN A. WILLOUGHBY, OF CAMBRIDGE, MASSACHUSETTS

PILOTING SYSTEM

Application filed January 8, 1929. Serial No. 331,004.

My invention relates broadly to an electrical piloting system and more particularly to the visual system for indicating the course of mobile bodies with respect to electromagnetically propagated waves.

One of the objects of my invention is to provide a system of electrical piloting in which the direction of a mobile body with respect to an electromagnetic wave may be indicated in a continuous manner and automatic indications given of any deviations of the mobile body from a predetermined course.

Another object of my invention is to provide an automatic switching system for the circuits of a radio receiver for alternately rendering effective or ineffective portions of the receiving circuit connected to separate collectors of radio frequency energy located in spaced relation to each other for integrating the effects of the received energy upon a local circuit arranged to visually indicate the character of the received energy.

Still another object of my invention is to provide a circuit arrangement for a radio receiver for use in piloting systems where a visual indicator is utilized to show the normal course and a plurality of indicators employed to show any deviation from the predetermined course of travel.

A further object of my invention is to provide a receiving circuit for a radio piloting apparatus where accurate indications are rapidly given of deviations from a predetermined course and an independent indicator operated at all times on the mobile body upon which the apparatus is located indicating the course as adhering to or conforming with a predetermined normal course of travel.

A still further object of my invention is to provide a circuit arrangement for a radio piloting system in which an oscillator alternately supplies energy to independent receiving circuits, rendering the circuits alternately effective to receive high frequency energy by means of collectors disposed in different planes of polarization for actuating by their conjoint effects a visual indicator system arranged to show any deviation of the mobile body, upon which the system operates, from a predetermined path of electromagnetic wave propagation.

My invention is particularly applicable for the piloting of aircraft where the craft flies between two predetermined distant points between which there is propagated electromagnetic energy. The apparatus of my invention is so designed that a visual indicator is arranged on board the aircraft and is normally energized to indicate the adherence or conformity to the course of travel of the aircraft with the line of propagation of the electromagnetic energy.

Deviations from the predetermined course are immediately apparent to the pilot by a change in condition of the normal path indicated and the actuation of a selected one of a plurality of deviation indicators for visually indicating the direction of the departure of the craft from the predetermined course.

My invention will be more fully understood by reference to the following specification and the accompanying drawings in which:

Figure 1 diagrammatically illustrates one form of my invention showing the independent radio frequency energy collectors which are located at spaced points on the mobile body and showing the circuit connections to the visual indicating apparatus; Fig. 2 is a modified form of apparatus in which the deviation from the predetermined course is indicated by the rate of change in condition of a plurality of indicators; and Fig. 3 shows a still further modification of the system of my invention wherein mechanical relays have been eliminated and electrical indicator systems have been employed for indicating the adherence to or departure from a predetermined course.

Referring to the drawings in detail I have shown two separate radio frequency energy collecting systems at X and Y, spaced one from the other and disposed on the mobile body, as for example on the planes of aircraft, in such manner that the resulting fields of the radio frequency energy collectors extend in different planes of polarization. The radio frequency energy collecting system X consists of loops 1 and 2 conveniently located on the plane or mobile body at substantially ninety degrees from each other. The terminals of the radio frequency energy collector X may be connected in series or parallel and shunted by tuning condenser 3 and connect to the input terminals of a receiving circuit which may include a radio frequency amplifier system, a detector, and an audio frequency amplifier system but which for the purposes of illustration has been represented in the drawings as a detector tube 4 and grid leak and grid condenser 5 in the grid circuit thereof. The output circuit of detector tube 4 connects through audio frequency transformer 6 with the input circuit of a suitable audio frequency amplifier designated for the purposes of my invention by reference character 7. The output circuit of the amplifier system 7 includes the winding 8 of a relay system 9. The output circuit of amplifier tube 7 is completed to source of potential 10. The cathodes for the detector tube 4 and amplifier tube 7 may be heated from the common source of potential indicated at 11.

The radio frequency energy collecting system Y comprises coils 12 and 14 disposed in planes substantially at ninety degrees to each other. The coils are so connected with respect to the connection of coils 1 and 2 that the resultant fields of the radio frequency energy collector systems X and Y are substantially at right angles. I have indicated this condition by arrows 15 and 16. Coils 12 and 14 may be connected in series or parallel to constitute the radio frequency energy collecting system Y with the circuit terminals thereof connected across tuning condenser 17 to the input circuit of the radio receiving system which for the purpose of illustration has been shown as an electron tube detector 18 with grid leak and grid condenser 19 in the grid circuit thereof. The output of detector 18 is connected through audio frequency transformer 20 with the input of a suitable audio frequency amplifier as represented by electron tube 21 and has relay winding 22 disposed in the output circuit thereof, the output circuit including the source of potential 10 as shown. The cathodes of detector tube 18 and audio frequency amplifier tube 21 are heated from battery system 11. It will be observed that the output circuits of detector tube 4 and detector tube 18 do not contain the usual source of plate potential. I supply a source of plate potential for detector tubes 4 and 18 from an oscillator circuit which includes electron tube 23 having its input and output circuits electrostatically coupled by means of condenser system 24. The input and output circuits of the oscillator 23 include inductance systems 25 and 26, the inductance system 25 being coupled to an inductance 27 disposed in series in the output circuit of detector tube 4 while inductance 26 is coupled to inductance 28 which is disposed in series in the output circuit of detector tube 18. The oscillator is so timed in its operation that energy will be alternately supplied to the output circuit of detector tube 4 and to the plate circuit of detector tube 18 at predetermined time intervals. This results in the alternate functioning of the detector systems when energy is picked up on collector X or Y.

Reverting to the relay system it will be observed that an armature member 41 is normally positioned between the control magnets 8 and 22 and so long as energy is of the same intensity on collectors X and Y the relay armature 41 remains in a normal or neutral position. It will be observed that a relay 29 is provided having a winding 29' and an armature 30 with cooperating contact 31 with the normal indicator light S shown at 32 connected across the battery circuit 11 in series with the armature 30 and contact 31 normally closed by means of spring 33. So long as the energy in the collectors X and Y remains equal there is no tendency for armature 41 to move and indicator light 32 therefore gives a visual indication that the pilot is flying a straight course in the path of the propagation of electromagnetic waves between two predetermined points. The armature 41 may be biased by a spring 42 which tends to maintain the armature in the position to which it moves thereby avoiding any rattling or vibration of the armature.

Other means may be provided for controlling the armature 41 such as a dashpot or suitable damper. Shading coils may also be provided so as to prevent chattering of the armature 41. When the plane changes its course one way or the other, thereby departing from the predetermined path of electromagnetic wave propagation, the armature 41 is moved in the direction of the stronger signal. That is to say, if the signal energy in the collector system X predominates over the signal energy in the collector system Y relay winding 8 attracts armature 41 closing contact 34, energizing indicator light 35 by connecting light 35 across battery system 11, and simultaneously energizing winding 29' of relay 29 by connecting winding 29' across battery system 11 through the circuit completed through lead 36 to armature 41 and contact 34. Inasmuch as indicator 35 is energized the pilot has the opportunity of swinging the plane back into the course and when this takes place light 35 is extinguished and light 32 is again energized. However, should the pilot bring the plane too far in the opposite direction the signal energy in collector system Y predominates over the energy in collector X thereby energizing relay winding 22, attracting armature 41 and closing the circuit through contact 49, lamp 37 and battery system 11, thereby energizing lamp 37 simultaneously with the opening of the circuit formed by armature 30 and contact 31 by virtue of the energization of relay winding 29'.

In the operation of the system illustrated in Fig. 1 a predominating signal in collector system X impresses a positive charge on the grid of detector tube 4 through the action of the grid leak and grid condenser 5. When a positive charge is impressed upon the plate of detector tube 4 by the oscillator 23 through the coupling system 25 and 27 there will be a response in the plate circuit of tube 4 which through the action of transformer 6 will supply energy to the grid of the amplifier tube 7. Since the plate circuit of tube 7 has a positive potential from battery 10 impressed thereon this will cause the solenoid 8 to move the armature 41 thus bringing about the functions heretofore explained. When a negative charge is impressed upon the plate circuit of tube 4 from oscillator 23 no effect is produced in the amplification system 7 and even though signaling energy may be coming in the solenoid 8 does not respond. A similar action occurs in the energy collecting system Y and the associated detector and amplifier circuits. The oscillator 23 therefore serves as a mechanical switching system avoiding any necessity of manual movement of controls and thus alternately rendering the separate receivers effective and ineffective for integrating the effects of the energy received in the different planes of polarization upon the automatic indicating apparatus.

In Fig. 2 I have illustrated an arrangement similar to that described in connection with Fig. 1 with the exception that a double armature system is provided for the relay windings 8 and 22. The double armature consists of movable armature members 38 and 39 each independently movable but electrically connected together through lead 40 which extends to one side of battery system 11.

Upon movement of armature 38 to close contact 34 lamp 35 is connected across battery system 11 and is thereby energized when signal energy predominates in the collector system X. Contact 49 connects through lamp 37 with one side of battery system 11 so that when the plane is normally on its course and substantially equal energy is being picked up by collector systems X and Y the lamps 35 and 37 will alternately flicker at a constant frequency depending upon the period of the oscillator 23. When however, energy predominates in collector system X or Y the light connected to the circuit which receives the strongest signal will flicker at the rate determined by the oscillator and the other light will be extinguished. The object sought in the circuit of Fig. 2 is to have the pilot fly a straight course which he determines by the equal flickering of the lights 35 and 37.

In Fig. 3 I have shown a signal system similar to the circuits heretofore illustrated except that I provide neon lamps as means for indicating the amplitude of the energy picked up by the separate collecting systems. The neon or glow lamp 45 connects through step-up transformer 46 with the output circuit of amplifier system 21. When the pilot adheres to a predetermined normal course the glow lamps 43 and 45 have an equal intensity. As the pilot deviates from his course the glow lamp connected to the circuit which picks up the greatest amount of energy glows much brighter or stronger than the other lamp indicating that the pilot is deviating from the predetermined course. The oscillator 23 supplies energy alternately to the detector circuit 4 and detector circuit 18 as described in connection with Figs. 1 and 2.

In lieu of the neon or glow lamps 43 and 45 I may utilize a deflecting meter such as a milliammeter which will indicate the strength of the incoming signaling energy in each receiving circuit.

My invention clearly simplifies apparatus employed for piloting and substantially eliminates the human equation from consideration inasmuch as the circuits may be set and do not require adjustment from time to time. It is unnecessary that any particular skill be required in the observation of the operation of the system inasmuch as the lighting or glowing of a lamp or deflection of a meter is the only factor which must be regarded. The arrangement shown in Fig. 3 is particularly accurate inasmuch as by the proper predetermined biasing potential at 48 and 50 in the amplifier system 27 and 21 permits the glow lamps 43 and 45 to be set for operation at predetermined values of energy introduced into the collector systems. The biasing systems 48 and 50 may be selected of such value as to operate the system at required efficiency.

While I have described my invention in certain of its preferred embodiments I desire that it be understood that modifications may be made and that no limitations upon my invention are intended other than are imposed by the scope of the appended claims.

What I claim as new and desire to secure by Letters Patent of the United States is as follows:

1. In a system for guiding mobile bodies, means for receiving electromagnetic energy on either side of a predetermined course, independent receiving circuits connected to each of said means, mechanism for rendering said receiving circuits alternately effective and ineffective, independent relay devices individual to each of said receiving circuits, a third relay device controlled by the operation of the aforesaid relay devices, a normal course indicator operated under condition of balanced signal in each of said independent receiving circuits, and separate indicator apparatus actuated by said independent relay devices for indicating the preponderance of energy in either of said energy collecting systems.

2. In a system for indicating the course of travel of mobile bodies with respect to a predetermined directively propagated electromagnetic wave channel, a pair of independent radio frequency energy collecting systems carried by the mobile body, separate radio receiving circuits connected to each of said collecting systems, relay devices individual to each of said receiving circuits, separate indicators controlled by each of said relay devices, a third relay device controlled by the aforesaid relay devices, an independent indicator apparatus operated by said third relay device, and means for alternately and successively rendering said receiving circuits effective and ineffective for operating said indicator apparatus by the conjoint effect of the signaling energy picked up by said collecting systems.

3. In a system for electrically guiding a mobile body, means disposed in different planes on the mobile body for collecting radio frequency energy in different directions, individual signal receiving means separately connected to said collecting means, an audio frequency generator for rendering said signal receiving means successively effective and ineffective for receiving signal energy incident upon the collecting means, separate relay means connected to each of said signal receiving means, an independent relay, means controlled by the aforesaid relay means and individual to each of said relay means for indicating the preponderance of energy in either of said collecting means.

4. A system for electrically guiding mobile bodies according to an electromagnetically propagated wave channel, comprising a pair of collectors for receiving radio frequency energy from different directions, independent electron tube receiving units connected with said collectors, an indicator apparatus connected with said receiving units, said apparatus having a pair of branches each controllable by one of said collectors and a third branch controlled by the operation of the aforesaid branches, and means for rendering effective the energy from said collectors each respectively upon its associated indicator branch in succession for determining by the conjoint operation of said indicator apparatus the course of the electromagnetic propagated wave channel.

5. In a system for electrically guiding mobile bodies with respect to an electromagnetic wave channel propagated in a predetermined course, a plurality of radio frequency energy collecting means, separate electron tube receiving units connected to each of said means, a common source of energy for alternately exciting said receiving units in succession, relays controlled by said receiving circuits, a third relay controlled by the aforesaid relays, indicator mechanism connected with said relays, said indicator mechanism being controllable by each of said receiving circuits for determining by the conjoint action of said indicator mechanism, the adherence of said mobile body to or departure from said electromagnetic wave channel.

6. In a system for guiding mobile bodies according to the course of an electromagnetically propagated wave channel, a plurality of separate receiving means each comprising an electron tube for selectively receiving energy from said electromagnetic wave channel from different angular directions with respect to the direction of movement of the mobile body, indicator mechanism including a plurality of branches, independent receiving circuits disposed between said separate receiving means and at least two of the branches of said indicator mechanism, another of said branches being controlled according to the actuation of the aforesaid branches, means for alternately and successively exciting the anodes of the electron tubes of said separate receiving means for rendering effective the received energy upon the several branches of said indicator mechanism for visually differentiating the strength of the energy received in the separate receiving means from said electromagnetically propagated wave channel.

7. In a system for electrically guiding mobile bodies, a pair of directively positioned coil systems mounted on the mobile body each having a directive characteristic extending at an angle to the line of propagation of an electromagnetic wave defining a predetermined navigable course, separate receiving circuits connected with each of said coil systems, separate indicators connected with said receiving circuits, and a normal course indicator operative upon a balanced condition of said receiving circuits for representing the condition of adherence of the mobile body to the course of the electromagnetic wave propogation, said other indicators being independently operated according to the strength of signal received by said separate receiving circuits for determining the departure of said mobile body from said predetermined course.

8. In a homing system for aircraft navigable according to a predetermined course defined by an electromagnetically propagated wave, a pair of directively positioned coil systems each adapted to receive energy from the propagated electromagnetic wave in a direction disposed at an angle with respect to the sense of direction of the propagated wave system, independent receiving circuits connected with said coil systems, separate indicators connected to said receiving circuits, and a normal course indicator connected with said aforementioned indicators, said normal course indicator being operative upon a condition of balance of energy in said coil systems for representing the adherence of the aircraft to the predetermined course, said normal course indicator being disconnected upon departure of said aircraft from the predetermined course, and said other indicators energized according to the preponderance of energy received by the respective coil systems for determining the departure of the aircraft from the predetermined course.

9. In a system for electrically guiding ships on a determined navigable course defined by a radio wave, a pair of coil antenna systems radio directively positioned on a ship symmetrically with reference to the center line of the ship, individual electron tube receiving units connected with each of said coil antenna systems, a differential signal responsive device connected to said electron tube receiving units, a normal course visual indicator operated when the center line of the ship coincides with said determined navigable course, a right deviation visual indicator operated when the center line of said ship deviates to the right of said determined navigable course, and a left deviation visual indicator operated when the center line of said ship deviates to the left of said determined navigable course, each of said visual indicators being controlled by said signal responsive device.

10. In a system for electrically guiding ships on a determined navigable course defined by a radio wave, a pair of coil antenna systems radio directively positioned on a ship symmetrically with reference to the center line of the ship, individual electron tube receiving units connected with each of said coil antenna systems, a differential signal responsive device connected to said electron tube receiving units, a normal course visual indicator operated when the center line of the ship coincides with said determined navigable course, a right deviation visual indicator operated when the center line of the ship deviates to the right of said determined navigable course, and a left deviation visual indicator operated when the center line of the ship deviates to the left of said determined navigable course, each of said visual indicators consisting of a light emitting electrically operated device respectively controlled by said differential signal responsive device.

11. In a system for electrically guiding ships on a determined navigable course defined by a radio wave, a pair of coil antenna systems radio directively positioned on a ship symmetrically with reference to the center line of the ship, individual electron tube receiving units connected with each of said coil antenna systems, an electron tube oscillator having its output connected to the anode circuit of each of said electron tube receiving units, a differential signal responsive device connected to said electron tube receiving units, a normal course visual indicator operated when the center line of the ship coincides with said determined navigable course, a right deviation visual indicator operated when the center line of the ship deviates to the right of said determined navigable course, and a left deviation visual indicator operated when the center line of the ship deviates to the left of said determined navigable course, each of said visual indicators being controlled by said signal responsive device.

12. In a system for electrically guiding ships on a determined navigable course defined by a radio wave, a pair of coil antenna systems radio directively positioned on a ship symmetrically with reference to the center line of the ship, individual electron tube receiving units connected with each of said coil antenna systems, an electron tube oscillator having its output connected to the anode circuit of each of said electron tube receiving units, individual relays actuated by the output of each of said electron tube receiving units, a third relay controlled by the aforesaid relays, a right deviation visual indicator operated by one of said relays when the center line of the ship deviates to the right of said determined navigable course, a left deviation visual indicator operated by the other of said relays when the center line of the ship deviates to the left of said determined navigable course, a normal course indicator controlled by said third relay each of said visual indicators consisting of a light emitting electrically operated device.

In testimony whereof I affix my signature.
JOHN A. WILLOUGHBY.